United States Patent [19]
Peugeot

[11] 3,919,467
[45] Nov. 11, 1975

[54] X-RAY BAGGAGE INSPECTION SYSTEM
[75] Inventor: Richard S. Peugeot, Atlanta, Ga.
[73] Assignee: Ridge Instrument Company, Inc., Tucker, Ga.
[22] Filed: Aug. 27, 1973
[21] Appl. No.: 392,035

[52] U.S. Cl. ............................. 178/6.8; 178/DIG. 5
[51] Int. Cl.² .......................................... H04N 7/18
[58] Field of Search ........... 178/6.8, DIG. 5; 360/35

[56] References Cited
UNITED STATES PATENTS

| | | | |
|---|---|---|---|
| 3,229,089 | 1/1966 | Sasao | 178/DIG. 5 |
| 3,280,253 | 10/1966 | McMaster | 178/DIG. 5 |
| 3,352,968 | 11/1967 | Walter | 360/35 |
| 3,745,245 | 7/1973 | Yunde | 178/6.8 |

*Primary Examiner*—Howard W. Britton

[57] ABSTRACT

An X-ray baggage inspection system in which an X-ray generator directs a beam through an object of baggage and the resulting image, appearing on a fluorescent screen, is scanned by a low light level T.V. camera and the image stored, the generator being turned on for a selected number of T.V. scans or frames. The number of frames and thus the intensity of image accumulated and stored in a video scan converter, is controlled by the operator to enable only the radiation exposure necessary to obtain a legible T.V. image, the image being displayed on a T.V. monitor.

2 Claims, 1 Drawing Figure

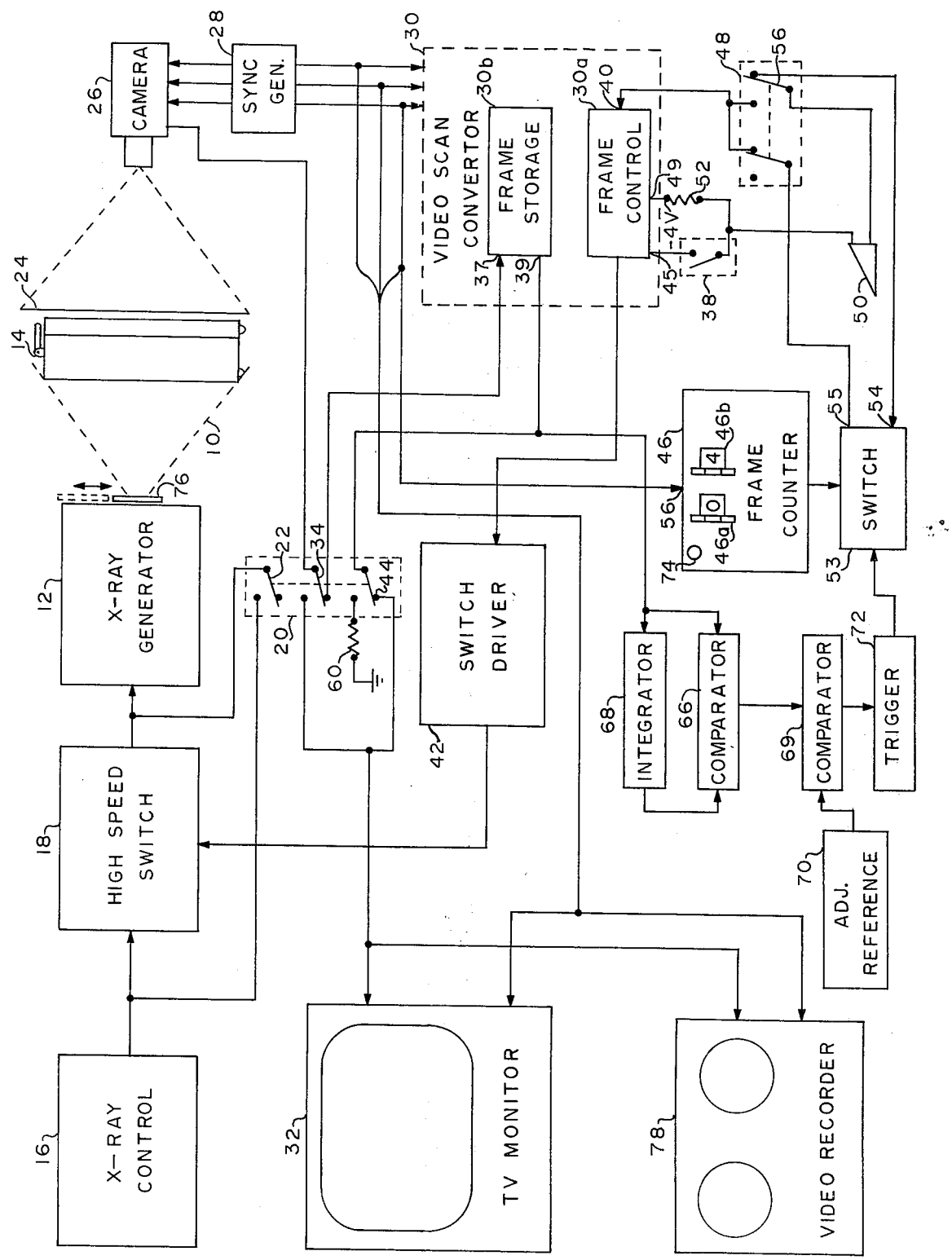

X-RAY BAGGAGE INSPECTION SYSTEM

FIELD OF THE INVENTION

The present invention relates to devices and systems for the formation of radiographic images of the internal structure of objects of varying thickness and composition wherein it is required or desirable that only a minimum amount of radiation penetrate an object.

BACKGROUND OF THE INVENTION

The use of penetrating X-radiation to perform radiographic inspection of both animate and inanimate objects is well known. In such an inspection, the X-radiation is directed through the test object with the radiographic results being recorded on photographic emulsion, or, in the case of real time imaging, observed on a fluorescent screen. Improvements in real time fluorescent imaging have been brought about through the use of electronic image intensifiers to electronically brighten the fluoroscopic image. Also, sensitive T.V. cameras are used to reproduce a fluorescent image or output of an image intensifier to thus further enhance the sensitivity of real time imaging. However, in all of the known systems, fairly large amounts of penetrating X-radiation are required to form a readable image, such requirements being due in part to the fact that the fluoroscopic technique requires a large amount of incident radiation per unit time to achieve a satisfactory screen brightness even when electronic image intensification is used. Furthermore, this dosage of radiation is typically applied to the test object throughout the duration of the examination. However, if the test object is at rest, no new information is gained by continuously irradiating the test object and, in fact, if the test object, animate or inanimate, is of a sensitive nature, such as photographic film, etc., as might be contained in baggage, harm may be done by virtue of the accumulated dosage (X-ray level $x$ time of exposure).

As disclosed in one system described in the patent art, an X-ray image storage, reproduction and comparison system has been designed whereby through the use of a video disc recorder the fluoroscopic image may be recorded and played back after the X-rays have been shut off, thereby significantly reducing the required X-ray dosage. However, this system does not particularly include means to control dosage to that required in a given case to produce a discernable image. This is particularly significant in baggage inspection because of variations in size and characteristics of baggage which in turn cause significant variations in X-ray transmissivity. Dosage control is also important because of the frequent presence of sensitive materials such as photographic emulsions which are commonly carried in baggage.

In another system, an electrical-in, electrical-out storage tube is used to store a video signal derived from a closed circuit television camera which may then be repeatedly read out through the use of a T.V. monitor. While this system offers the advantage of allowing an operator to shut off an X-ray source and view a static test object afterward, thereby significantly reducing dose required, as in the other patented system, no means are provided to reduce the radiation dose rate of that required to form a useful image of a particular object.

In the area of X-ray photograph, in an endeavor to reduce the radiation dose rate required in making radiographs, multiple X-ray films made from a single low-dose exposure have been superimposed so that when the films are viewed in an additive fashion, the result is an image of enhanced contrast as compared to the contrast which would be obtained from a single film technique. However, due to scatter and the divergence of the X-ray beam, the sharpness of such an X-ray image almost invariably suffers.

In still another known system disclosed in the patent art, two television cameras are employed for the simultaneous viewing and electronic superimposition of images of a single object and the recording of same on film. While this technique overcomes some of the problems of superimposing two films together, one difficulty with such a system is that there occurs a substantial flicker in the T.V. reproduced image because of the inability of two television cameras to charge and rapidly erase in an identical fashion the two electronically derived images. Also, such a technique is not a real time method in that it does require the taking and processing of radiographs.

SUMMARY OF THE INVENTION

Broadly the present invention provides for short exposure, stored integrated images, with pseudo-real time imaging by electronic storage and display, wherein a high quality radiation image is developed through the integration of one or more video frames by an electronic storage tube device until an image of suitable contrast is built up. The system is entirely synchronized by sync pulses which are used to gate an X-ray subsystem "on" and then "off" to present a preselected number of integrated video frames to the storage tube. The system is operable in a plurality of modes, providing for conventional real time direct imaging, pseudo-real time integrated stored image operation in both manual and automatic modes, and stop action imaging.

BRIEF DESCRIPTION OF THE DRAWINGS

FIG. 1 is an electrical block diagram of a low-dose, high resolution X-ray inspection system, as contemplated by this invention.

DESCRIPTION OF THE DRAWINGS

An X-ray beam 10 is generated by X-ray generator 12 to provide a beam path cross-section of sufficient size to illuminate an object such as luggage bag 14. X-ray generator 12 is adapted to provide a beam of intensity upon bag 14 of 0.001 to 0.01 roetgens/minute. X-ray control 16 provides either power input or "turn on" control signals compatible with and required by X-ray generator 12. The power or signal connection between X-ray control 16 and X-ray generator 12 is selective being either directly between these units or through high speed switch 18, depending upon the position of switch 20. As shown, movable contact 22 of switch 20 is positioned open and thus the switching on of X-ray generator 12 is accomplished by high speed switch 18.

When X-ray generator 12 is turned on, there is provided a visible light image on fluorescent screen 24 which outlines the contents of bag 14, depending upon transmission characteristics of any object contained therein. Fluorescent screen 24 is viewed by a low-light level T.V. camera 26 which is controlled by vertical, horizontal and blanking pulses provided by a built-in pulse generator or by an external one, as illustrated by T.V. sync-pulse generator 28. The data or image information from T.V. camera 26 is provided to either video scan converter 30 or directly to T.V. display monitor 32 depending upon the position of movable contact 34 of switch 20. As shown, video information is routed to video scan converter 30. Video scan converter 30 is an existing type apparatus which is adapted to store one frame of T.V. information or a plurality of frames which may be added together, or integrated, to provide for image enhancement. One such apparatus, identified as Model PEP 400, is a product of Princeton Electronic Products, Inc.

Video scan converter 30 is provided blanking, vertical and horizontal sync pulses from T.V. sync pulse generator 28 and thus T.V. camera 26 and video scan converter 30 are synchronized together. Video scan converter 30 includes a built-in switching circuit frame control 30A, responsive to a predetermined voltage or voltage pulse applied at input 40 for storing in frame storage 30B, a frame of an image from T.V. camera 26. The period of one frame is one-thirtieth of a second and a signal of this width, a frame signal, is generated within video scan converter 30 to accomplish this operation. Frame control 30A also includes an erase control switch 38, for purposes of illustration shown outside of the block marked frame control 30A, which upon being operated, erases a stored image.

In order to illuminate the object to be viewed for a precise period of one T.V. frame, frame control 30A provides the frame signal to switch driver 42 which develops a signal of appropriate shape and level to operate high speed switch 18 which in turn actually turns on X-ray generator 12 for one frame of scanning. At the end of a frame signal and thus a scan period of video, frame control 30A opens the video input 37 from T.V. camera 26 and provides, on a repeating basis, from output 39, the stored signal frame through switch contact 44 of switch 20 to T.V. monitor 32, where the image of the contents of bag 14 may be almost instantaneously viewed. This continues until an operator closes erase control switch 38 which applies a control voltage at terminal 45 which causes the frame to be erased.

It will be noted that a composite sync output, blanking, vertical, and horizontal sync pulses, are fed from sync generator 28 to T.V. monitor 32, thus providing synchronization between these units and of course between the T.V. monitor and camera 26, since the source of the sync pulses is T.V. sync pulse generator 28.

Keeping in mind that the goal of the system is to provide adequate image detail with minimum radiation exposure of a particular object, the system provides two methods of signal integration by the selection of a number of frames of exposure. In one method, a count down counter, frame counter 46, is preset by set wheels 46A and 46B with a desired number (for example, the number 4 as shown) of frames to be observed, integrated and stored. Then, with selector switch 48 in an automatic mode, as shown, foot switch 50 is closed. The result is that a control voltage, −4 volts as shown, obtained from a reference output 49 of video scan converter 30 is applied through a load resistor 52, through switch 50, selector switch 48 to control input 54 of a normally open electronic switch 53. Switch 53 is controlled by frame counter 46 and includes a normally open switching circuit which is closed by each down counting event to close a circuit between input 54 and output 55 providing the control voltage as a pulse or trigger input through switch 48 to input 40 of frame control 30A of video scan converter 30.

Frame counter 46 is actually counted downward by vertical sync pulses from sync pulse source 28 applied at input 56 and for each count. Frame counter 46 provides a frame or trigger input to signal frame switch 53 to cause several synchronous events. One, a frame length period switching signal is supplied by frame control 30A to switch driver 42, which in turn supplies an appropriate level signal for this period of time to high speed switch 18. As stated above, this in turn causes X-ray generator 12 to be energized and bag 14 to be illuminated. At the same time, frame storage 30B of video scan converter 30 is turned on for the same period of time and thus receives from T.V. camera 26 one frame of image which is then stored. With a preset count of 4 set into down counter 46, there would occur in rapid succession, gated by input vertical sync pulses, four synchronized closings of the output gating circuit of frame counter 46 causing video scan converter 30 and X-ray generator 12 to be gated on four times. The result would be that at the conclusion of the four frame inputs, the video input of video scan converter 30 is internally blocked and the resultant stored image is internally switched to provide a frame image at T.V. monitor 32. The actual number of accumulated frames employed in a given case would be the number which an operator determined to be required to generate an image of adequate detail. From experience an operator may become skilled in determining that certain class objects require a particular number of frames of exposure and may quickly preset down counter 46 for the particular object to be inspected.

Alternately, the system provides for single exposure control and this mode of operation is achieved with switch 48 moved to an opposite position, which movable contact 56 closing a circuit directly between switch 50 and trigger input 40. In this mode, the operator may press foot switch 50 a sufficient number of times to provide an image of sufficient detail on T.V. monitor 32 to enable him to obtain an image which satisfies the purposes of his inspection.

In certain instances an operator may perfer to override frame control operation and deliberately apply continuous irradiation to an object while viewing T.V. monitor 32. In such case, switch 20 is operated to the opposite position to that shown and T.V. camera 26 is directly connected to T.V. monitor 32. In which case a dummy load, resistor 60, is connected across the output of video scan converter 30 to provide a constant load.

Still alternately, the number of frames of exposure may be automatically controlled by sensing the contrast of the video output of scan converter 30, continuing frames of exposure until a contrast level (between black and white signals) is sufficient to insure a readable picture. This may be accomplished by means of sampling signal values and comparing them with some standard or average value. For example, the video output of scan converter 30 would be fed directly to one input of a comparator 66 and through an integrator 68 to a second input of comparator 66. Integrator 68 would average the video signal over some selected period, such as that of a complete frame. Comparator 66 would then provide a thus derived "contrast" signal output to one input of a second comparator 69. A reference "contrast" voltage is selected by an adjustable reference voltage source 70 and applied to a second input of comparator 69. Comparator 69 would then provide an output signal of a selected polarity when the "contrast" signal from the comparator 66 equalled or exceeded the reference "contrast" signal. This signal is then fed to trigger circuit 72, which, responsively, operates switch 53 upon the occurrence of such an "exceeded contrast" signal. Thus switch 53 may be cut off prior to some maximum count set into frame counter 46 which would have been selected as a maximum exposure count. Alternately, switch 53 would be hand operated "on" by a hand switch 74 in frame counter 46 (without a count in frame counter 46) which would pass the vertical sync signal input to switch 53. Switch 53 would then be turned off by the "contrast" signal and thus provide automatically the number of frames of exposure needed to achieve a selected contrast.

A contrast signal may also be obtained by sampling a video signal and differentiating it. The differential signal would be compared in comparator 69 against the reference and trigger circuit 72 would be energized when the contrast signal exceeded or equalled (depending upon the type of comparator) the referenced signal. Where the comparator included a zero crossing detector, an output would be provided trigger circuit 72 when the reference and contrast signals were the same.

As a still further feature of the invention, a filter 76 adapted to block radiation in a portion of the X-ray energy spectrum, e.g. below a maximum energy of 20 to 50 Kev, constituting softer radiation, is selectively movable in or out of the radiation path between X-ray generating means 12 and object 14. In this manner, a still further means of simple and effective adjustment may be made in the overall level of radiation applied to an object.

Video recorder 78 records, sequentially, image frames fed T.V monitor 32 to enable, when desired, a record to be kept of inspections. As in the case of T.V. monitor 32, appropriate synchronization signals are fed to recorder 78 from video scan converter 30 to effect complete synchronization of the system.

The present invention enables a great deal of guess work to be taken out of X-ray inspection, particularly X-ray inspection of baggage. It provides an integrated system which takes unique advantage of the combination of a medium powered and relatively safe X-ray generator, with a precisely timed incremental system of exposure. It enables reduced radiation levels over those commonly used, and largely avoids the annoying problems of fogging photographic film and dileterious effect on magnetic tape in baggage, problems which currently plague some systems used for baggage inspection, as well as enhancing the operational safety of such X-ray inspections.

What is claimed is:

1. An X-ray inspection system comprising:

X-ray generating means for generating and directing an X-ray beam over a predetermined path;

X-ray-to-visible light conversion means positioned to intercept said beam and to provide a visible light image corresponding to the details of an object positioned in said path in accordance with the degree of transparency to X-rays of portions of the object;

electronic imaging means for scanning said image and producing at a predetermined scanned rate periodic sets of image information, each set representing a complete replica, or frame, of said image, and each set occurring during a frame period;

image storage means responsive to an output from said imaging means and a control signal for storing as a single frame information and, providing as an output, an image from at least one said frame of said image from one or more successive scanned frames of said image;

synchronization means for generating at least one recurring signal at said predetermined scanned rate and interconnecting and synchronizing at said rate information scanned by said imaging means and stored by said storage means;

control means responsive to said recurring signal of said synchronization means and coupled to said storage means and said X-ray generating means for selectively providing said control signal and turning on said X-ray generating means during and for a selected number of image frame periods, whereby an image of a desired exposure is obtained in said storage means, said control means comprising signal means responsive to the output of said image storage means for providing a contrast signal and providing a said control signal to turn off said X-ray generating means when said contrast signal reaches a predetermined level; and image display means coupled to the output of said storage means for selectively displaying a said stored image.

2. An X-ray inspection system as set forth in claim 1 wherein said control means comprises:

signal means responsive to the output of said image storage means for providing a contrast signal representative of the contrast occurring in the video signal;

comparator means responsive to said contrast signal and a preselected reference signal for providing a switching signal output when the said contrast signal at least equals said reference signal; and switching means responsive to the output of said comparator means for tuning off said X-ray generating means following the occurrence of a contrast signal at least equal to said reference signal and upon the completion of that number of frame periods which produced the said at least equal contrast signal, whereby the number of image frame periods of exposure are obtained as a function of signal contrast present in the video signal output of said image storage means.

* * * * *